United States Patent
Reed et al.

(10) Patent No.: US 9,247,621 B1
(45) Date of Patent: Jan. 26, 2016

(54) METHOD AND APPARATUS FOR SELECTIVELY LOADING A DIMMER CIRCUIT

(71) Applicant: Marvell International Ltd., Hamilton (BM)

(72) Inventors: Daniel Reed, Sunnyvale, CA (US); Wanfeng Zhang, Palo Alto, CA (US); Jinho Choi, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/558,239

(22) Filed: Dec. 2, 2014

Related U.S. Application Data (60) Provisional application No. 61/913,630, filed on Dec. 9, 2013.

(51) Int. Cl.
*H05B 37/02* (2006.01)
*H05B 33/08* (2006.01)

(52) U.S. Cl.
CPC ........ *H05B 37/0281* (2013.01); *H05B 33/0815* (2013.01); *H05B 33/0845* (2013.01)

(58) Field of Classification Search
CPC .............. H05B 37/02; H05B 33/0815; H02M 3/33507
USPC ................................................... 315/186, 224
See application file for complete search history.

(56) References Cited

U.S. PATENT DOCUMENTS

| | | | |
|---|---|---|---|
| 2012/0025729 A1* | 2/2012 | Melanson et al. | 315/224 |
| 2012/0286686 A1* | 11/2012 | Watanabe et al. | 315/224 |
| 2013/0162158 A1* | 6/2013 | Pollischansky | 315/201 |
| 2015/0130372 A1* | 5/2015 | Chitta et al. | 315/307 |

* cited by examiner

*Primary Examiner* — Don Le (57) ABSTRACT

Embodiments include an apparatus comprising: a magnetic component arrangement; and a switch coupled to the magnetic component arrangement, wherein the switch is configured to operate during a first time period, at a first frequency that results in transfer of a first amount of power to a lighting element via the magnetic component arrangement, and during a second time period, at a second frequency that results in transfer of a second amount of power to the lighting element via the magnetic component arrangement.

16 Claims, 5 Drawing Sheets

METHOD AND APPARATUS FOR SELECTIVELY LOADING A DIMMER CIRCUIT

CROSS REFERENCE TO RELATED APPLICATIONS

The present disclosure claims priority to U.S. Provisional Patent Application No. 61/913,630, filed on Dec. 9, 2013, which is incorporated herein by reference in its entirety.

TECHNICAL FIELD

Embodiments of the present disclosure relate to a dimmer circuit, and in particular to method and apparatus for selectively loading a dimmer circuit.

BACKGROUND

A dimmer circuit is used to vary the brightness of light generated by a lamp. For example, by changing a voltage waveform applied to the lamp, the dimmer circuit controls the brightness of the light output by the lamp.

A dimmer circuit may be designed to work with, for example, an incandescent lamp. Incandescent lamps typically consume relatively high power (e.g., in the range of 40 Watts to 100 Watts, or more). In modern days, energy efficient lights (e.g., compact fluorescent lamp (CFL), light-emitting diodes (LEDs), etc.) have become popular over incandescent lamps. These energy efficient lights consume substantially less power, compared to incandescent lamps. It is desirable that a dimmer circuit, which may be designed for incandescent lamps, work flawlessly with modern energy efficient lights.

SUMMARY

In various embodiments, the present disclosure provides an apparatus comprising: a magnetic component arrangement; and a switch coupled to the magnetic component arrangement, wherein the switch is configured to operate during a first time period, at a first frequency that results in transfer of a first amount of power to a lighting element via the magnetic component arrangement, and during a second time period, at a second frequency that results in transfer of a second amount of power to the lighting element via the magnetic component arrangement. In an embodiment, the second frequency is higher than the first frequency. In an embodiment, the switch is further configured to operate, during a third time period, at a third frequency that results in (i) transfer of a third amount of power to the lighting element via the magnetic component arrangement and (ii) loss of a fourth amount of power in the magnetic component arrangement; and the third frequency is (i) higher than the first frequency and (ii) lower than the second frequency. In an embodiment, during the first time period, the switch is configured to be switched on and off with the first frequency such that (i) each time the switch is on, current passes through the magnetic component arrangement, causing the magnetic component arrangement to store energy and (ii) each time the switch is off, the energy stored in the magnetic component arrangement is transferred to the lighting element. In an embodiment, the lighting apparatus is configured to be coupled to a dimmer circuit comprising a charging module; and during the second time period, operating the switch at the second frequency results in current flowing through the charging module of the dimmer circuit thereby charging the charging module. In an embodiment, the apparatus further comprises: a controller configured to generate a switching signal, wherein the switch is configured to receive the switching signal, and wherein the controller is further configured to control the switch, via the switching signal, to cause the switch to (i) during the first time period, operate at the first frequency and (ii) during the second time period, operate at the second frequency. In an embodiment, the magnetic component arrangement comprises a transformer; and the transformer comprises (i) a primary coil coupled to the switch and (ii) a secondary coil coupled to the lighting element. In an embodiment, the lighting element comprises a light-emitting diode (LED) string. In an embodiment, the second amount of power comprises zero or nearly zero power.

In various embodiments, the present disclosure also provides a method for operating a lighting apparatus comprising a lighting element, a magnetic component arrangement, and a switch coupled to the magnetic component arrangement, wherein the method comprises: during a first time period, operating the switch at a first frequency that results in transfer of a first amount of power to the lighting element via the magnetic component arrangement; and during a second time period, operating the switch at a second frequency that results in transfer of a second amount of power to the lighting element via the magnetic component arrangement. In an embodiment, the second frequency is higher than the first frequency. In an embodiment, the method further comprises: during a third time period, operating the switch at a third frequency that results in (i) transfer of a third amount of power to the lighting element via the magnetic component arrangement and (ii) loss of a fourth amount of power in the magnetic component arrangement, wherein the third frequency is (i) higher than the first frequency and (ii) lower than the second frequency. In an embodiment, operating the switch at the first frequency comprises: during the first time period, switching the switch on and off with the first frequency such that (i) each time the switch is on, current passes through the magnetic component arrangement, causing the magnetic component arrangement to store energy and (ii) each time the switch is off, the energy stored in the magnetic component arrangement is transferred to the lighting element. In an embodiment, the lighting apparatus is configured to be coupled to a dimmer circuit comprising a charging module, and wherein operating the switch at the second frequency comprises: during the second time period, operating the switch at the second frequency thereby resulting in current flowing through the charging module of the dimmer circuit, and thereby charging the charging module. In an embodiment, the method further comprises: generating, by a controller included in the lighting apparatus, a switching signal; receiving, by the switch, the switching signal; and controlling, by the controller via the switching signal, the switch by causing the switch to (i) during the first time period, operate at the first frequency and (ii) during the second time period, operate at the second frequency.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
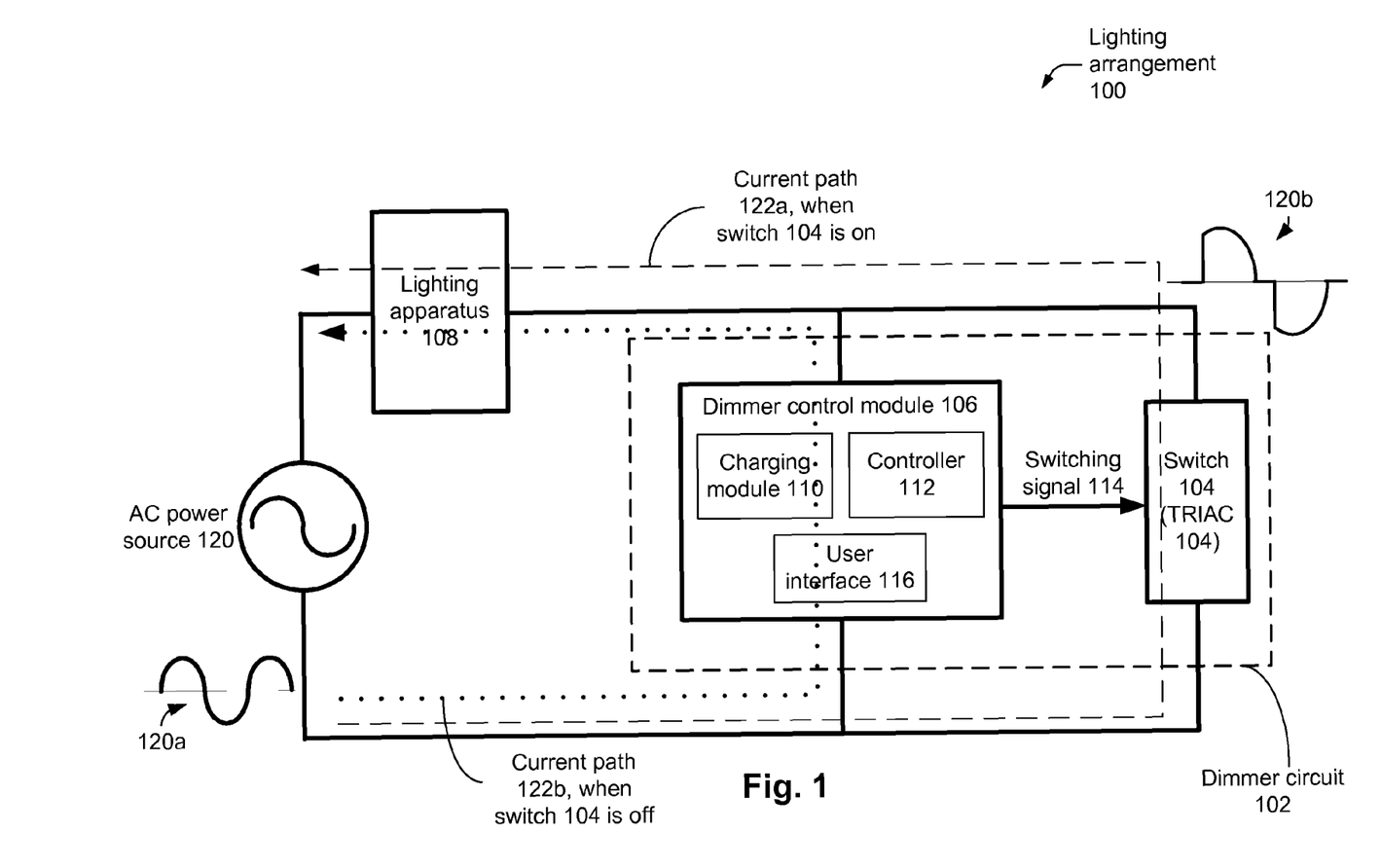
FIG. 1 schematically illustrates a lighting arrangement comprising an alternating current (AC) power source, a dimmer circuit, and a lighting apparatus.

FIG. 1 schematically illustrates a lighting arrangement 100 comprising an alternating current (AC) power source 120, a dimmer circuit 102 (illustrated using dashed lines in FIG. 1), and a lighting apparatus 108. In an embodiment, the lighting apparatus 108 comprises an energy efficient light (e.g., a CLF light bulb, an LED light bulb, etc.).

The dimmer circuit 102 is configured to control the lighting apparatus 108. For example, the dimmer circuit 102 controls or varies a brightness of light output by the lighting apparatus 108 (e.g., in addition to switching on or off the lighting apparatus 108), e.g., by controlling a voltage waveform applied to the lighting apparatus 108.

In an embodiment, the dimmer circuit 102 comprises a switch 104 and a dimmer control module 106. The switch 104, for example, switches on and off, thereby controlling a voltage waveform applied to the lighting apparatus 108 from the AC power source 120. The switch 104 is controlled by a switching signal 114 generated by the dimmer control module 106.

In an embodiment, the switch 104 comprises a Triode for Alternating Current (TRIAC), one or more silicon-controlled rectifier (SCRs), one or more transistors, and/or the like. For the purposes of this disclosure, unless otherwise mentioned, and for purposes of simplicity, it is assumed that the switch 104 comprises a TRIAC. Accordingly, henceforth, the switch 104 is also referred to as TRIAC 104. However, the principles of this disclosure can be applied to any other types of switching elements, for example, SCRs, transistors, and/or the like.

In the embodiments in which the switch 104 comprises a TRIAC, the switching signal 114 generated by the dimmer control module 106 is a gate trigger current $I_{GT}$ for the TRIAC.

The dimmer control module 106 comprises a charging module 110, a controller 112, and a user interface 116. The user interface 116, for example, comprises a knob, a slider switch, and/or the like. A user of the lighting arrangement 100 uses the user interface 116 to select or change a brightness of the lighting apparatus 108. Based on an input received from the user via the user interface 116, the controller 112 controls the switching of the switch 104, via the switching signal 114.

The charging module 110, for example, comprises one or more capacitors. In an embodiment, the charging module 106 (e.g., a capacitor included in the charging module 110) stores charge or power during a part of each cycle of the sinusoidal AC voltage signal from the AC power source 120, and uses the stored power to operate the dimmer control module 106 and provide the switching signal 114 to the switch 104, as will be discussed in more detail herein later.

FIG. 1 illustrates an example voltage signal 120a supplied by the AC power source 120. FIG. 1 also illustrates an example voltage signal 120b output by the switch 104 to the lighting apparatus 108. Merely as an example, by controlling the triggering angle of TRIAC 104 (e.g., via the switching signal 114), the voltage signal 120b is generated. As illustrated in FIG. 1, the voltage signal 120b has less average power, compared to that of the voltage signal 120a of the AC power source 120. By controlling the triggering angle of TRIAC 104, the voltage signal 120b supplied to the lighting apparatus 108 can be controlled, thereby controlling a brightness of the light output by the lighting apparatus 108.

While the TRIAC 104 is switched on (e.g., based on a state of the switching signal 114), current from the AC power source 120 is transmitted via the TRIAC 104 and the lighting apparatus 108, illustrated as current path 122a in FIG. 1 (illustrated using dashed lines in FIG. 1). Also, while the switch 104 is switched on, there is zero or nearly zero voltage drop across the TRIAC 104. Accordingly, while the TRIAC 104 is switched on, zero or nearly zero current from the AC power source 120 flows through the dimmer control module 106. Hence, while the TRIAC 104 is switched on, as zero or nearly zero current from the AC power source 120 flows through the dimmer control module 106, the charging module 110 cannot be charged.

While the TRIAC 104 is switched off (e.g., based on a state of the switching signal 114), there is a voltage drop across the TRIAC 104. Accordingly, while the TRIAC 104 is switched off, current from the AC power source 120 can be transmitted via the dimmer control module 106 and the lighting apparatus 108, illustrated as current path 122b in FIG. 1 (illustrated using dotted lines in FIG. 1). Current flowing through the current path 122b is used to charge the charging module 110.

In an embodiment, if the lighting apparatus 108 comprises energy efficient lights (e.g., CFL, LEDs, etc.) and when the TRIAC 104 is off, energy consumed by the lighting apparatus 108 can be very low. Accordingly, current through the current path 122b can be zero or nearly zero. Hence, the charging module 110 may not be fully charged by such low current via the dimmer control module 106, thereby resulting in the dimmer control module 106 not being able to fully or properly function. Hence, the switching signal 114 (which is the gate trigger current $I_{GT}$ for the TRIAC 104) generated by the dimmer control module 106 (e.g., the controller 112) may be low, e.g., lower than what is needed to effectively switch on the TRIAC 104. This may lead to an undesirable switching pattern in the TRIAC 104.

Furthermore, once the TRIAC 104 starts conducting (e.g., based on the switching signal 114), the TRIAC 104 continues conducting until a current through the TRIAC 104 falls below a hold-up current ($I_H$), or the AC voltage signal 120a goes through a zero crossing. However, if the lighting apparatus 108 comprises energy efficient lights (e.g., CFL, LEDs, etc.), energy consumed by the lighting apparatus 108 can be very low (nearly zero) before the AC voltage signal 120a reaches the zero crossing. Accordingly, in an example, even before the zero crossing of the AC voltage signal 120a, current through the TRIAC 104 can be very low (e.g., lower than the hold-up current $I_H$ of the TRIAC 104), leading to a pre-mature shut-down of the TRIAC 104.

Thus, due to the use of energy efficient lights (e.g., CFL, LEDs, etc.) in the lighting apparatus 108, the charging module 110 may not be fully charged (e.g., thereby leading to a low value of the gate trigger current $I_{GT}$ for the TRIAC 104), and/or the TRIAC 104 may shut down prematurely (e.g., before the zero crossing of the AC voltage signal). Accordingly, in an embodiment and as will be discussed in more detail herein later, the lighting apparatus 108 is configured to generate increased load for the dimmer circuit 106, without increasing a brightness provided by the lighting apparatus 108 (e.g., by not transferring the increased load to a lighting element of the lighting apparatus 108).

Figure 2:
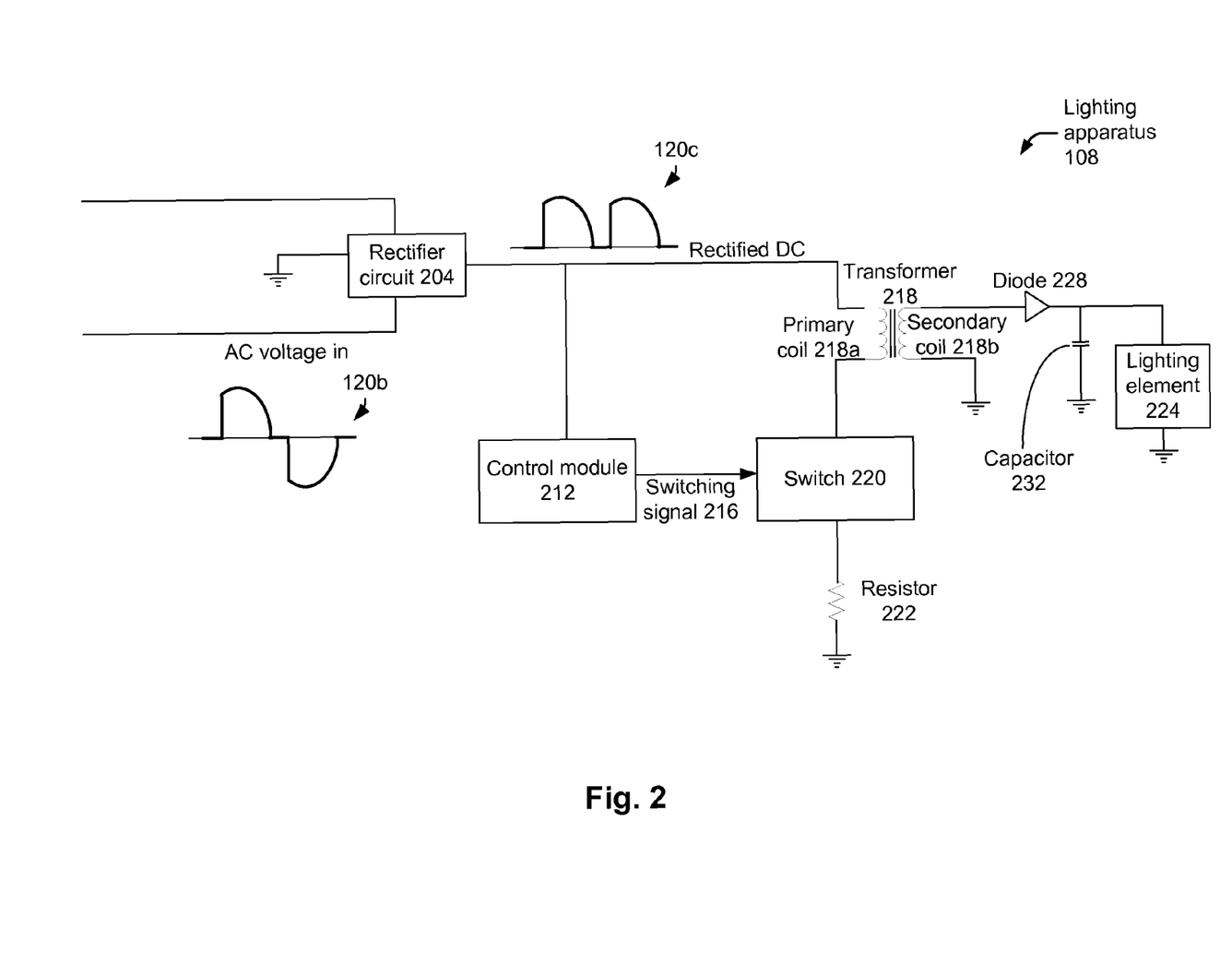
FIG. 2 schematically illustrates an example implementation of a lighting apparatus.

FIG. 2 schematically illustrates an example implementation of the lighting apparatus 108 of FIG. 1. The lighting apparatus 108 comprises a rectifier circuit 204. In an embodiment, the rectifier circuit 204 receives the AC voltage signal 120b from the TRIAC 104 and generates a rectified DC voltage 120c. In an embodiment, the rectifier circuit 204 is a diode bridge rectifier (e.g., comprising four diodes) or any other appropriate type of rectifier.

The lighting apparatus 108 further comprises a switch 220 and a control module 212. The control module 212 generates a switching signal 216 to control the switch 220. The control module 212 receives the rectified DC signal 120c to power the control module 212. The switch 220 receives the rectified DC signal 120c via a primary coil 218a of a transformer 218. The switch 220 is also coupled to the ground via a resistor 222.

The transformer 218 further comprises a secondary coil 218b coupled to a lighting element 224 via a diode 228. The lighting element 224 comprises, for example, a LED, a CFL, or the like. A capacitor 232 is connected between an output of the diode 228 and the ground terminal.

In operation, when the TRIAC 104 is switched on, the lighting apparatus 108 receives voltage from the AC power source 120 via the TRIAC 104. The switch 220 is switched on and off with, for example, a normal frequency Fn, e.g., based on the switching signal 216. In an example, the normal frequency Fn is substantially equal to about 100 kHz (kilo Hertz). As the switch 220 switches on and off with the normal frequency of Fn, during an on state of the switch 220, the primary coil 218a of the transformer 218 is charged (i.e., energy is stored in the primary coil 218a); and during an off state of the switch 220, the energy is transferred from the charged primary coil 218a of the transformer 218 to the secondary coil 218b. Based on the energy being transferred to the secondary coil 218b, the lighting element 224 operates and emits light. Thus, while the TRIAC 104 is switched on and during the normal operation of the lighting apparatus 108, the switch 220 operates at the frequency Fn, in order to transfer energy to the lighting element 224 via a magnetic component arrangement (e.g., an inductor) comprising the transformer 218. As will be discussed in more detail herein, the switch 220 selectively operates at a relatively high frequency (e.g., higher than the frequency Fn) at periodic intervals, in order to effectively load the dimmer circuit 102.

Figure 3:
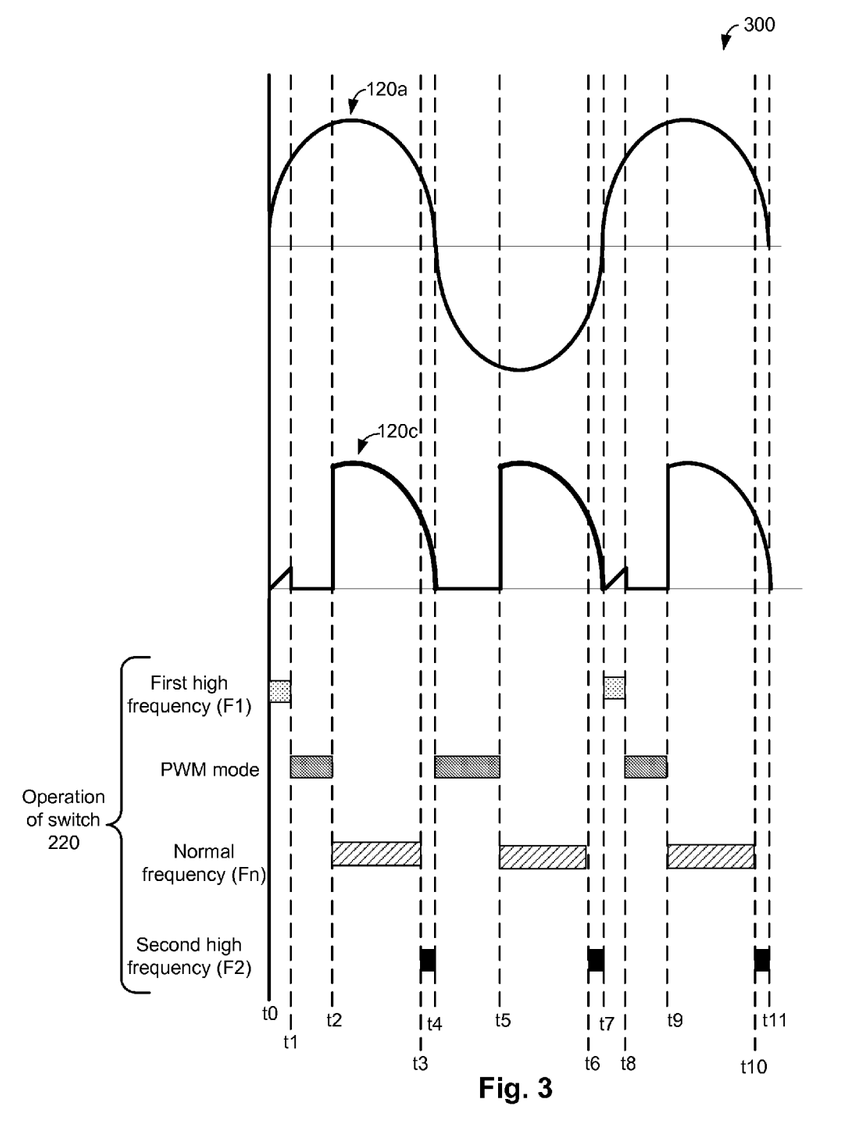
FIG. 3 illustrates a timing diagram illustrating an operation of a lighting apparatus.

FIG. 3 illustrates a timing diagram 300 illustrating an operation of the lighting apparatus 108. FIG. 3 illustrates the AC voltage signal 120a generated by the AC power source 120. FIG. 3 further illustrates the rectified DC voltage signal 120c of FIG. 2 in more detail. FIG. 3 also illustrates switching operation of the switch 220 of FIG. 2.

Referring to FIGS. 1-3, the AC voltage signal 120a generated by the AC power source 120 comprises sinusoidal waves having zero crossing at times t0, t4, t7, and t11. The TRIAC 104 is configured to be fired or switched on (e.g., using the switching signal 114) at times t2, t5, and t9. The switching on of the TRIAC 104 is based on an input received from a user, via the user interface 116, to control the brightness produced by the lighting apparatus 108.

As previously discussed, while the TRIAC 104 is on, current from the AC power source 120 does not pass via the dimmer control module 106, thereby preventing the charging module 110 from charging. In an embodiment, the charging module 110 is charged at a start of each positive cycle of the AC voltage signal 120a.

For example, between times t0 and t1, the switch 220 operates (i.e., switches on and off) at a high frequency F1. In an example, the high frequency F1 is a very high frequency, e.g., compared to the normal frequency Fn. As an example, the high frequency F1 is 2 MHz (mega Hertz) or higher, while the normal frequency Fn is about 100 kHz. In an example, the high frequency F1 is near or about equal to a maximum frequency at which the switch 220 can physically operate.

While the switch 220 operates at the high frequency F1, current is transmitted via the current path 122b, i.e., from the AC power source 120, via the dimmer control module 106 and the switch 220 of the lighting apparatus 108. While the switch 220 operates at the high frequency F1, the switch 220 is switched on periodically for a relatively small period of time (e.g., less than a threshold period of time), which is not long enough to sufficiently charge the primary coil 218a. That is, due to the high frequency of switching on and off of the switch 220 between times t0 and t1, each time the switch 220 is on for a relatively small period of time. The relatively small period of time is not long enough to sufficiently charge the primary coil 218a. Accordingly, while the switch 220 operates at the high frequency F1, the primary coil 218a is unable to transfer energy to the secondary coil 218b. Thus, between times t0 and t1, while the switch 220 operates at the high frequency F1 (e.g., higher than at least a threshold frequency), zero or nearly zero energy is transferred to the lighting element 224. Hence, no light is generated by the lighting element 224.

Due to the switching of the switch 220 at the high frequency F1, current passes (e.g., via the current path 122b) through the dimmer control module 106 while the switch 220 switches on, thereby allowing the charging module 110 to sufficiently charge. Thus, between times t0 and t1 (e.g., while the TRIAC 104 is off), the switch 220 switches on and off at the high frequency F1, thereby loading the dimmer control module 106, but transferring zero or nearly zero energy to the lighting element 224.

By time t1, the charging module 110 gets sufficiently or adequately charged (e.g., to generate the switching signal 114 during the corresponding AC cycle). So, at time t1, the switch 220 stops switching with the frequency F1. For example, between time t1 and t2, the switch 220 operates under a pulse width modulation (PWM) mode. In another example, between time t1 and t2, the switch 220 remains on (e.g., with the TRIAC 104 being off). Between times t1 and t2, the TRIAC 104 is off and the dimmer control module 106 is fully charged—accordingly, during this time, no current is being transmitted from the AC power source 120 to the lighting apparatus 108.

At time t2, the dimmer control module 106 controls the switching signal 114 to switch on the TRIAC 104. Thus, from time t2, the lighting apparatus 108 receives a high voltage, i.e., the rectified version of the AC voltage signal 120a, as illustrated in FIG. 3. From time t2, the switch 220 operates at the normal frequency Fn. In an example, the normal frequency Fn is about 100 kHz. As previously discussed, based on the operation of the switch 220 at the normal frequency Fn, energy is transferred to the lighting element 224, thereby resulting in the lighting element 224 emitting light.

The zero crossing of the AC cycle occurs at time t4. However, if the switch 220 is to continue operating at the normal frequency Fn till time t4, the TRIAC 104 can prematurely switch off (e.g., switch off before time t4) due to the low loading of the TRIAC 104 (e.g., as the current through the TRIAC 104 may get lower than the hold-up current $I_H$ of the TRIAC 104, earlier than the zero crossing of the AC voltage signal 120a is reached), as previously discussed. To prevent such prematurely switching off of the TRIAC 104, from time t3, the switch 220 operates at a high frequency F2. For example, from time t3 to time t4, the switch 220 operates at the high frequency F2. In an example, the high frequency F2 is higher than the normal frequency Fn, but lower than the high frequency F1. As an example, the high frequency F1 is about 2 MHz, the high frequency F2 is about 200 kHz, while the frequency Fn is about 100 kHz.

Between times t3 and t4, while the switch 220 operates at the high frequency F2, some energy is transferred to the lighting element 224. Also, the switching on and off by the switch 220 at the high frequency F2 results in switching loss in the switch 220 and the transformer 218. Thus, between times t3 and t4, (i) the energy transferred to the lighting element 224 and (ii) the switching loss in the switch 220 and the transformer 218 form a load for the TRIAC 104. Thus, the TRIAC 104 transmits a current, which is higher than a hold-up current $I_H$ of the TRIAC 104, until about the zero crossing of the AC voltage signal 120a. Hence, operating the switch 220 at the high frequency F2 prevents pre-mature shut-down of the TRIAC 104, prior to the zero crossing of the AC voltage signal 120a at time t4.

At time t4 (i.e., at zero crossing of the AC voltage signal 120a), the switch 220 stops operating at the high frequency F2 and the TRIAC 104 is switched off (e.g., based on the AC voltage signal 120a reaching the zero crossing).

Also, between times t4 and t7, the AC voltage signal 120a has a negative cycle. In an embodiment, the charging module 110 does not charge during the negative cycle of the AC voltage signal 120a. Accordingly, the switch 220 is not operated at the first high frequency F1 from time t4, as illustrated in FIG. 3. However, in another embodiment, the charging module 110 also charges during the negative cycle of the AC voltage signal 120a—in such an embodiment and although not illustrated in FIG. 3, the switch 220 operates at the first high frequency F1 from time t4 (similar to the operation of the switch 200 from time t0 to time t1).

At time t5, the TRIAC 104 is switched on, and the switch 220 operates at the normal frequency Fn from time t5 to time t6 (e.g., similar to the operation of the switch 220 between times t2 to t3). Between times t6 to t7, the switch 220 operates at the high frequency F2 (e.g., similar to the operation of the switch 220 between times t3 to t4). The operation of the switch 220 from time t7 to time t11 is similar to the operation of the switch 220 between times t0 to t4.

Thus, by operating the switch 220 at the high frequency F1, the dimmer control module 106 is effectively loaded (e.g., between times t0 and t1, and also between times t7 and t8), thereby resulting in the charging module 110 being sufficiently charged, but without transferring energy to the lighting element 224. Also, by operating the switch 220 at the high frequency F2, the TRIAC 104 is effectively loaded (e.g., between times t3 and t4, and also between times t6 and t7), thereby preventing any pre-mature shutdown of the TRIAC 104.

Figure 4:
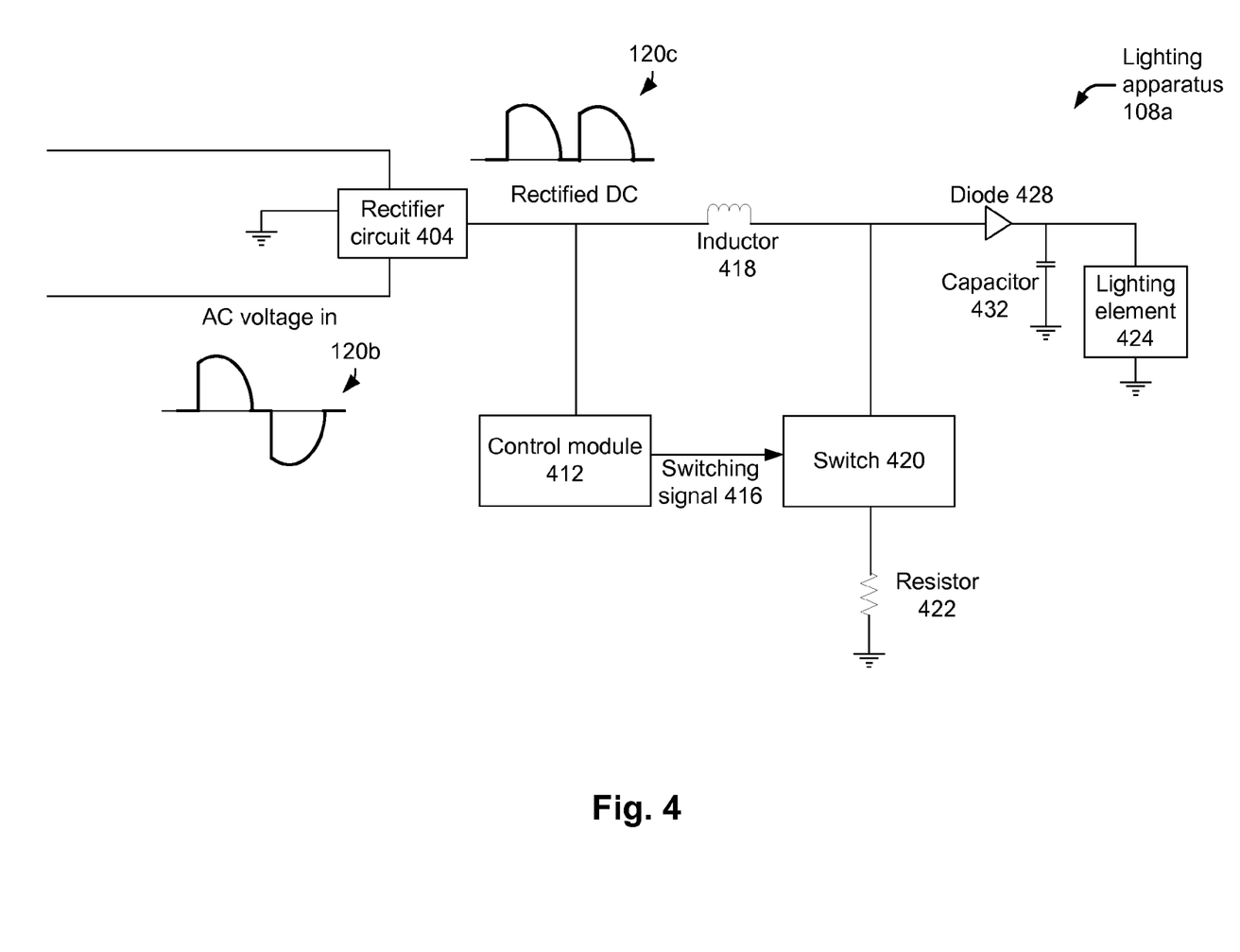
FIG. 4 schematically illustrates another example implementation of a lighting apparatus.

FIG. 4 schematically illustrates another example implementation of the lighting apparatus 108 of FIG. 1 (labeled as lighting apparatus 108a in FIG. 4). The lighting apparatus 108a of FIG. 4 is in part similar to the lighting apparatus 108 of FIG. 2. For example, the lighting apparatus 108a of FIG. 4 comprises a rectifier circuit 404, a control module 412, a switch 420, a diode 428, a resistor 422, a lighting element 424, and a capacitor 432, each of which is similar to a corresponding component of the lighting apparatus 108 of FIG. 2. For example, the switch 420 is similar to and operates in a manner that is similar to the operation of the switch 220 of FIG. 2. In an example, the lighting element 424 of FIG. 4 comprises a LED string.

In an embodiment, the transformer 218 of lighting apparatus 108 of FIG. 2 is replaced by a magnetic component, e.g., an inductor 418 in the lighting apparatus 108a of FIG. 4. As the switch 420 switches on and off with the normal frequency of Fn, during an on state of the switch 420, the magnetic component, e.g., the inductor 418 is charged (i.e., energy is stored in the inductor 418); and during an off state of the switch 420, the stored energy is transferred from the inductor 418 to the capacitor 432 and/or the lighting element 424. Based on the energy being transferred to the lighting element 424, the lighting element 424 operates and emits light.

In an embodiment, while the switch 420 operates at the high frequency F1, the switch 420 is switched on for a relatively small period of time (e.g., less than a threshold period of time), which is not long enough to sufficiently charge the inductor 418. Accordingly, while the switch 420 operates at the high frequency F1, the inductor 418 is unable to store charge, or transfer energy to the lighting element 424; and hence, no light is generated by the lighting element 424 (although the charging module 110 gets charged). Similarly, the operation of the switch 420 at the high frequency F2 prevents pre-mature shutting off of the switch 104 of the dimmer circuit 102, as discussed with respect to the switch 202.

Figure 5:
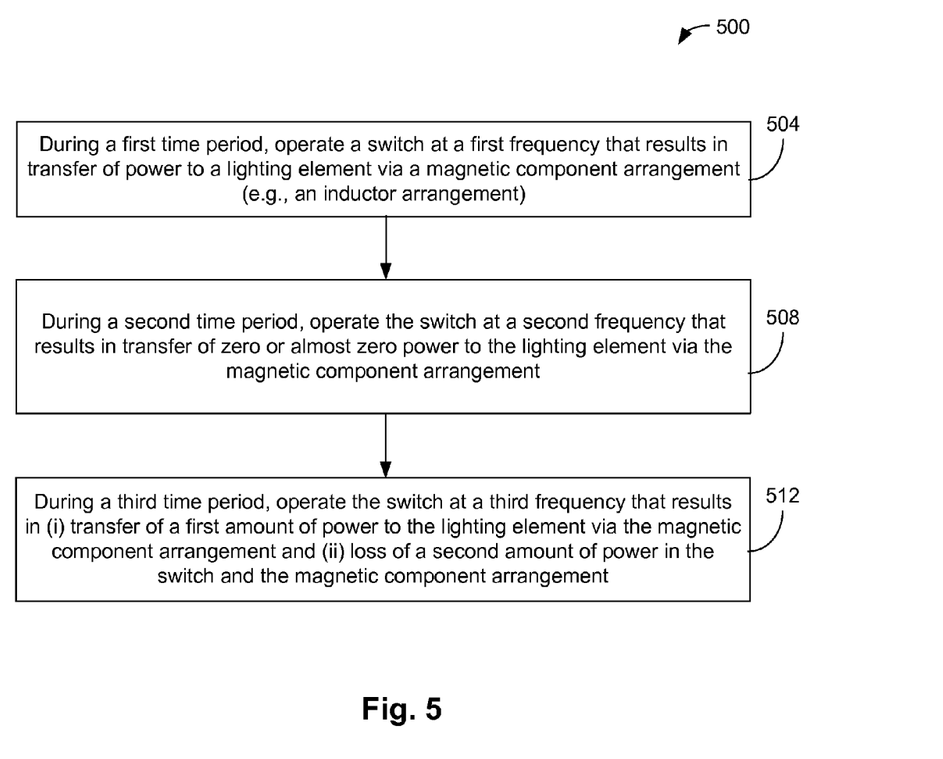
FIG. 5 is a flow diagram of an example method to operate a lighting apparatus.

FIG. 5 is a flow diagram of an example method 500 to operate a lighting apparatus (e.g., the lighting apparatus 108 of FIG. 2 and/or the lighting apparatus 108a of FIG. 4). At 504, during a first time period (e.g., between times t2 and time t3), a switch (e.g., the switch 220 or switch 420) is operated at a first frequency (e.g., normal frequency Fn) that results in transfer of power to a lighting element (e.g., lighting element 224 or lighting element 424) via a magnetic component arrangement (e.g., an inductor arrangement comprising the transformer 218 or the inductor 418).

At 508, during a second time period (e.g., between times t0 and time t1), the switch is operated at a second frequency (e.g., high frequency F1) that results in transfer of zero or nearly zero power to the lighting element via the magnetic component arrangement.

At 512, during a third time period (e.g., between times t3 and t4), the switch is operated at a third frequency (e.g., high frequency F2) that results in (i) transfer of a first amount of power to the lighting element via the magnetic component arrangement and (ii) loss of a second amount of power in the switch and the magnetic component arrangement.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a magnetic component arrangement; and
   a switch coupled to the magnetic component arrangement,
      wherein the switch is configured to operate during a first time period, at a first frequency that results in transfer of a first amount of power to a lighting element via the magnetic component arrangement, and during a second time period, at a second frequency, wherein while the switch operates at the second frequency, zero or nearly zero power is transferred to the lighting element via the magnetic component arrangement, and wherein the second frequency is higher than the first frequency.

2. The apparatus of claim 1, wherein:

the switch is further configured to operate, during a third time period, at a third frequency that results in (i) transfer of a second amount of power to the lighting element via the magnetic component arrangement and (ii) loss of a third amount of power in the magnetic component arrangement; and the third frequency is (i) higher than the first frequency and (ii) lower than the second frequency.

3. The apparatus of claim 1, further comprising:

a controller configured to generate a switching signal, wherein the switch is configured to receive the switching signal, and wherein the controller is further configured to control the switch, via the switching signal, to cause the switch to (i) during the first time period, operate at the first frequency and (ii) during the second time period, operate at the second frequency.

4. The apparatus of claim 1, wherein the lighting element comprises a light-emitting diode (LED) string.

5. An apparatus comprising:

a magnetic component arrangement; and a switch coupled to the magnetic component arrangement, wherein the switch is configured to operate during a first time period, at a first frequency that results in transfer of a first amount of power to a lighting element via the magnetic component arrangement, and during a second time period, at a second frequency that results in transfer of a second amount of power to the lighting element via the magnetic component arrangement, wherein during the first time period, the switch is configured to be switched on and off with the first frequency such that (i) each time the switch is on, current passes through the magnetic component arrangement, causing the magnetic component arrangement to store energy and (ii) each time the switch is off, the energy stored in the magnetic component arrangement is transferred to the lighting element.

6. The apparatus of claim 5, wherein:

during the second time period, the switch is configured to be switched on and off with the second frequency such that each time the switch is on, current passes through the magnetic component arrangement, and a duration of time during which the switch is on is smaller than a threshold value thereby resulting in the magnetic component arrangement to (i) not be sufficiently charged and (ii) transfer zero or nearly zero power to the lighting element.

7. An apparatus comprising:

a magnetic component arrangement; and a switch coupled to the magnetic component arrangement, wherein the switch is configured to operate during a first time period, at a first frequency that results in transfer of a first amount of power to a lighting element via the magnetic component arrangement, and during a second time period, at a second frequency that results in transfer of a second amount of power to the lighting element via the magnetic component arrangement, wherein the lighting apparatus is configured to be coupled to a dimmer circuit comprising a charging module, and wherein during the second time period, operating the switch at the second frequency results in current flowing through the charging module of the dimmer circuit thereby charging the charging module.

8. The apparatus of claim 7, wherein:

the switch is a first switch; and the dimmer circuit further comprises a second switch configured to be (i) switched on during the first time period to thereby supply power to the lighting apparatus during the first time period and (ii) switched off during the second time period.

9. An apparatus comprising:

a magnetic component arrangement; and a switch coupled to the magnetic component arrangement, wherein the switch is configured to operate during a first time period, at a first frequency that results in transfer of a first amount of power to a lighting element via the magnetic component arrangement, and during a second time period, at a second frequency that results in transfer of a second amount of power to the lighting element via the magnetic component arrangement, wherein the magnetic component arrangement comprises a transformer, and wherein the transformer comprises (i) a primary coil coupled to the switch and (ii) a secondary coil coupled to the lighting element.

10. A method for operating a lighting apparatus comprising (i) a lighting element, (ii) a magnetic component arrangement, and (iii) a switch coupled to the magnetic component arrangement, wherein the method comprises:

during a first time period, operating the switch at a first frequency that results in transfer of a first amount of power to the lighting element via the magnetic component arrangement; and during a second time period, operating the switch at a second frequency, wherein while the switch operates at the second frequency, zero or nearly zero power is transferred to the lighting element via the magnetic component arrangement, and wherein the second frequency is higher than the first frequency.

11. The method of claim 10, further comprising:

during a third time period, operating the switch at a third frequency that results in (i) transfer of a second amount of power to the lighting element via the magnetic component arrangement and (ii) loss of a third amount of power in the magnetic component arrangement, wherein the third frequency is (i) higher than the first frequency and (ii) lower than the second frequency.

12. The method of claim 10, further comprising:

generating, by a controller included in the lighting apparatus, a switching signal;

receiving, by the switch, the switching signal; and controlling, by the controller via the switching signal, the switch by causing the switch to (i) during the first time period, operate at the first frequency and (ii) during the second time period, operate at the second frequency.

13. A method for operating a lighting apparatus comprising (i) a lighting element, (ii) a magnetic component arrangement, and (iii) a switch coupled to the magnetic component arrangement, wherein the method comprises:
   during a first time period, operating the switch at a first frequency that results in transfer of a first amount of power to the lighting element via the magnetic component arrangement; and
   during a second time period, operating the switch at a second frequency that results in transfer of a second amount of power to the lighting element via the magnetic component arrangement,
   wherein operating the switch at the first frequency comprises
      during the first time period, switching the switch on and off with the first frequency such that (i) each time the switch is on, current passes through the magnetic component arrangement, causing the magnetic component arrangement to store energy and (ii) each time the switch is off, the energy stored in the magnetic component arrangement is transferred to the lighting element.

14. The method of claim 13, wherein operating the switch at the second frequency comprises:
   during the second time period, switching the switch on and off with the second frequency such that
      each time the switch is on, current passes through the magnetic component arrangement, and
      a duration of time during which the switch is on is smaller than a threshold value thereby resulting in the magnetic component arrangement to (i) not be sufficiently charged and (ii) transfer zero or nearly zero power to the lighting element.

15. A method for operating a lighting apparatus comprising (i) a lighting element, (ii) a magnetic component arrangement, and (iii) a switch coupled to the magnetic component arrangement, wherein the method comprises:
   during a first time period, operating the switch at a first frequency that results in transfer of a first amount of power to the lighting element via the magnetic component arrangement; and
   during a second time period, operating the switch at a second frequency that results in transfer of a second amount of power to the lighting element via the magnetic component arrangement,
   wherein the lighting apparatus is configured to be coupled to a dimmer circuit comprising a charging module, and wherein operating the switch at the second frequency comprises
   during the second time period, operating the switch at the second frequency thereby resulting in current flowing through the charging module of the dimmer circuit, and thereby charging the charging module.

16. The method of claim 15, wherein:
   the switch is a first switch; and
   the dimmer circuit further comprises a second switch configured to be (i) switched on during the first time period to thereby supply power to the lighting apparatus during the first time period and (ii) switched off during the second time period.

* * * * *